US006516970B2

(12) United States Patent
Bejerano

(10) Patent No.: US 6,516,970 B2
(45) Date of Patent: Feb. 11, 2003

(54) FEEDER DEVICE FOR ORIENTING ELONGATED MECHANICAL COMPONENTS THEREIN

(76) Inventor: Abraham Bejerano, 3327 Harvard St., Santa Ana, CA (US) 92704

( * ) Notice: Subject to any disclaimer, the term of this patent is extended or adjusted under 35 U.S.C. 154(b) by 113 days.

(21) Appl. No.: 09/833,923

(22) Filed: Apr. 12, 2001

(65) Prior Publication Data

US 2002/0039525 A1 Apr. 4, 2002

Related U.S. Application Data

(62) Division of application No. 09/420,458, filed on Oct. 18, 1999, now Pat. No. 6,230,395.

(51) Int. Cl.[7] .................................................. B23Q 7/12
(52) U.S. Cl. ........................................ 221/173; 221/265
(58) Field of Search ................................ 221/157, 171, 221/173, 265; 193/44, 45, 47

(56) References Cited

U.S. PATENT DOCUMENTS 2,875,884 A * 3/1959 Harrington, Jr.
4,619,356 A * 10/1986 Dean et al. ............. 221/171 X

* cited by examiner

*Primary Examiner*—David H. Bollinger
(74) *Attorney, Agent, or Firm*—Roger C. Turner

(57) ABSTRACT

The present invention is directed to a feeder device. The feeder device receives components end-to-end in a random orientation in a vertical inlet chute and feeds each of the components one-at-time having a desired orientation to an outlet chute. The feeder device includes a rotatable disk having a central chamber therein adapted to receive each of the components, a sensing means for determining the orientation of the component, and includes a releasable gate. The disk and gate function independently, as required, between the inlet chute and the outlet chute, to sequentially release each component having the desired orientation; or to invert each component not having the desired orientation from end-to-end into the desired orientation and then to release the component, whereby each component is released one-at-a-time having a desired orientation for utilization.

9 Claims, 13 Drawing Sheets

FEEDER DEVICE FOR ORIENTING ELONGATED MECHANICAL COMPONENTS THEREIN

This is a division of application Ser. No. 09/420,458, filed Oct. 18, 1999, now U.S. Pat. No. 6,230,395.

BACKGROUND OF INVENTION

The invention relates to a feeder device for loose bulk components; particularly a feeder device for receiving randomly oriented components, and releasing each of the components having a desired orientation, for utilization in a crimping machine or other component fed apparatus.

Small elongated components are in common use throughout industry, and various devices and machines have been developed to facilitate the handling and utilization of these components, particular for automated processes into larger systems. Examples of such small elongated components include the various sizes and shapes of electrical contacts and connectors that are attached to electrical wire conductors and circuits by various well known soldering, bonding and crimping techniques.

A particular problem associated with the handing and assembly of small elongated components is that the components have different end configurations that require reliable orientation thereof for utilization in automated assembly processes.

The above problem is handled by some systems that pre-form or pre-assemble the components into a strip or belt type carrier, having a fixed orientation, for utilization in a crimping or processing machine. The use of such fixed configurations may require more complicated designs of the components and the processing machines, and often result in excessive scrap of the unused carrier materials. Also, some components can not be so adapted for such fixed orientation carrier feeding configurations.

A terminal handling apparatus of the prior art is disclosed in U.S. Pat. No. 5,115,904 entitled Apparatus for Rotating an Electrical Lead About its Axis. The patent describes a machine for receiving a thin rectangular terminal connector on a conveyer belt and rotating the terminal over to re-position the crimping tangs within a crimping machine for processing. The prior art does not address the problem of inverting such a component end-to-end to a desired orientation for utilization; and does not indicate how such an apparatus could be adaptable to solve this problem.

The utilization of small elongated components is usually more efficient when the components can be handled in loose bulk quantities. Various machines have been developed to handle loose bulk quantities of components, particularly electrical pin contacts. Such machines usually incorporate a vibratory bowl having an internal helical track leading to a sorting gate and an exit chute. The efficient orientation of components within a vibratory bowl require components having a heavy end or a shoulder configuration near one end that allows most of the components to be arranged by vibration properly oriented into the track and sorted by the gate for dispensing and for re-circulating those few that are not properly oriented. An example of such a component handling device is disclosed in U.S. Pat. No. 4,721,222 entitled Apparatus for Dispensing Elongated Small Mechanical Parts, which was invented by the inventor of the present invention.

A particular feeder problem is presented by small elongated components that have different end configurations and have no shoulder to facilitate reliable orientation in a vibratory bowl. An example of this type of component is a commonly used female electrical pin connector (identified as MIL-C-39029/57-357 contact size 22D) having one end with a hollow diameter for connection with a mating male pin connector, and having one end with a somewhat smaller hollow diameter for crimping to a wire conductor. These connectors are used in multiple-connector, high density circuitry applications having very tight space requirements, and the specifications do not permit a shoulder on the component. (The mating male connector is relatively smaller and does have a shoulder, and can be handled by conventional feed devices for utilization by current crimping machines.) Conventional bowl and feeder devices of these female pin connectors offer about 50% having the desired orientation and require repeated sorting and re-circulation of the components within the bowl. This re-circulation results in inefficient throughput and can cause damage to the components due to excessive handling. Other reliable alternatives, require such connectors to be oriented by hand for utilization in a conventional crimping machine.

In view of the foregoing, it is an object of the present invention to provide a feeder device for receiving small elongated components end-to-end in random orientation and reliably and efficiently dispensing them having a desired orientation for utilization.

It is another object to provide a feeder device for receiving loose bulk components end-to-end in random orientation and reliably dispensing them one-at-a time having a desired orientation upon demand for utilization with a crimping machine.

SUMMARY OF THE INVENTION

The foregoing objects are accomplished by an improved feeder device of loose bulk components of the present invention. The feeder device is adapted for receiving elongated components in a random end-to-end orientation, with each of the components having a first end and a reduced diameter second end, and upon demand, for dispensing each of the components one-at-a-time having the second end oriented upwardly as a desired orientation.

The device is generally contained within a housing having an inlet chute adapted to receive the components and an outlet chute adapted to dispense the components. A rotatable disk is positioned laterally between the inlet chute and the outlet chute of the housing, having a diameter corresponding to the length of the first end of one of the components and having a central chamber therein adapted to receive one of the components. The disk is oriented initially at a home position defined as having a first opening of the chamber in communication with the inlet chute and having a second opening of the chamber in communication with the outlet chute. The disk is rotatable to a second position to generally invert the orientation of the chamber above the outlet chute and then back to the home position, thereby having the first opening of the chamber in communication with the outlet chute.

The device further includes a gate positioned laterally in the housing, between the disc and the outlet chute. The gate has an internal end having a slot therein in communication with the second opening of the chamber. The slot having a height corresponding to the length of the second end of one of the components and having a width adapted to receive the second end of one of the components and adapted not to receive the first end of one of the components. Whereby, one of such components oriented with the second end upwardly in the chamber would rest on the slot of the gate, and one of such components oriented with the second end downwardly in the chamber would rest within the slot of the gate. The gate is adapted so that the slot is released from a closed position blocking the second opening of the chamber to an open position not blocking the second opening of the chamber.

The device includes a sensor adapted to determine whether one of the components is oriented having the second end upwardly or with the second end downwardly within the chamber. A controller receives the orientation information from the sensor and is adapted for controlling the gate from the closed position to the open position, and for controlling the rotatable disc to the home position and to the second position.

The device is adapted to function so that, upon demand, when the sensor indicates that one of the components is oriented with the second end upwardly in the chamber, the controller is adapted to release the gate away from the second end of the chamber and dispensed such component into the outlet chute having the desired orientation. When the sensor indicates that one of such components is oriented with the second end downwardly in the chamber, the controller is adapted to rotate the disc to the second position and such component is thereby inverted and dispensed into the outlet chute having the desired orientation.

BRIEF DESCRIPTION OF THE DRAWINGS

While the novel features of the invention are set forth in the appended claims, the invention will be better understood along with other features thereof from the following detailed description taken in conjunction with the drawings, in which:

DETAILED DESCRIPTION OF THE INVENTION

The feeder device of the present invention is adaptable for receiving any elongated component in an end-to-end random orientation and dispensing each of the components one-at-a time having a desired orientation for utilization. Examples of the invention are described in terms of a preferred embodiment of a feeding device for dispensing elongated electrical connector pins to a crimping device, and a preferred embodiment of a crimping machine incorporating the feeder device of the present invention.

Figure 1:
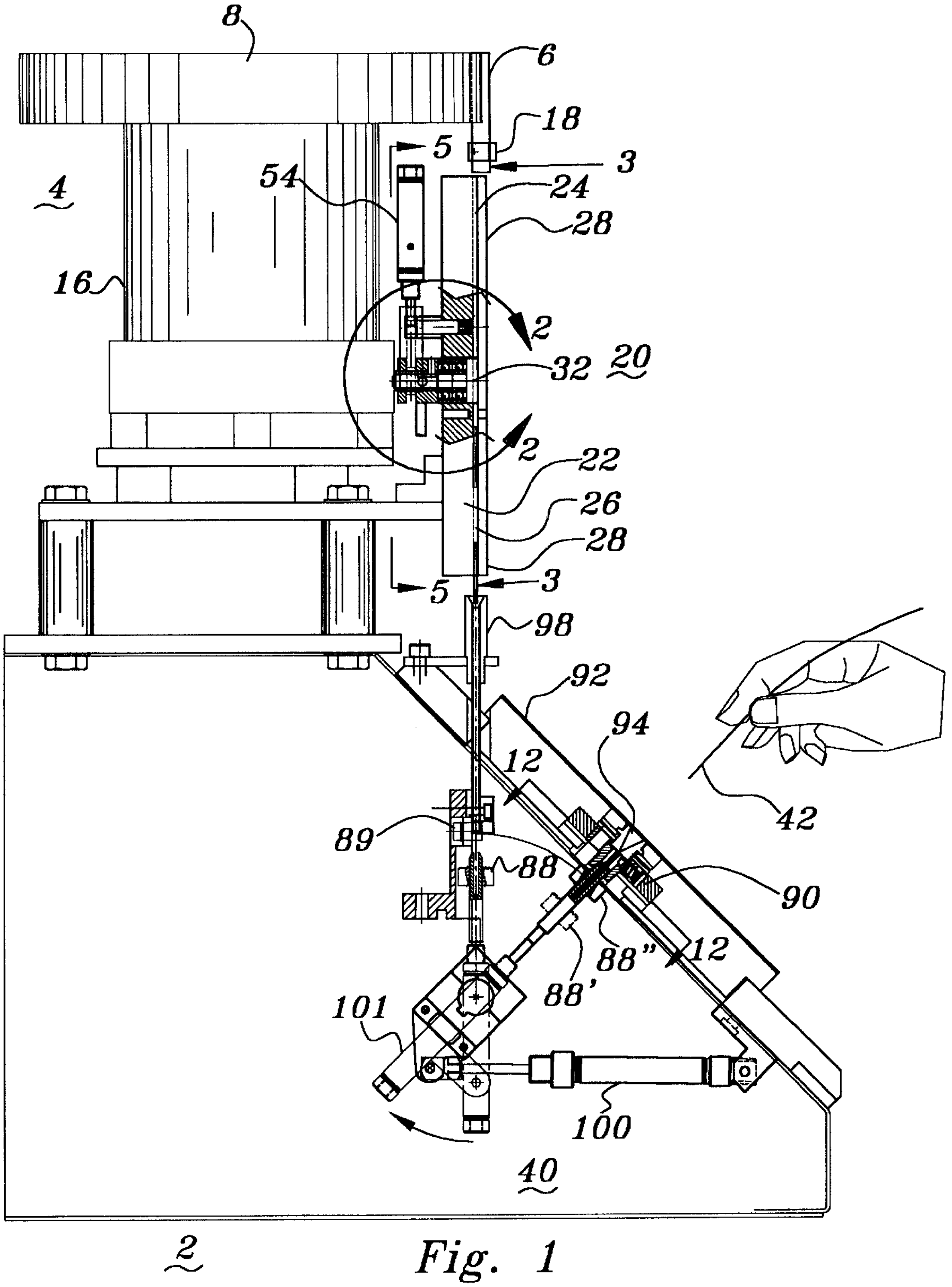
FIG. 1 is a left side elevational view shown in cross section generally through the center of the crimping machine of the present invention.

Referring first to FIG. 1, there is illustrated a typical crimping machine 2 incorporating a preferred embodiment of the present invention. The machine includes a hopper assembly 4 for receiving loose bulk quantities of elongated components 10 and supplying them aligned end-to-end and in random orientation to a supply chute 6 therein; a feeder device 20 for receiving a plurality of the components from the hopper assembly into an inlet chute 24, and adapted for feeding each of the components one-at-time having a desired orientation to an outlet chute 26; and a crimping assembly 40 for receiving one of the components, and also receiving and guiding a conductor 42 into the received component and, upon demand, crimping the received component thereby providing a secure electrical and mechanical attachment thereof on the conductor.

Figure 2:
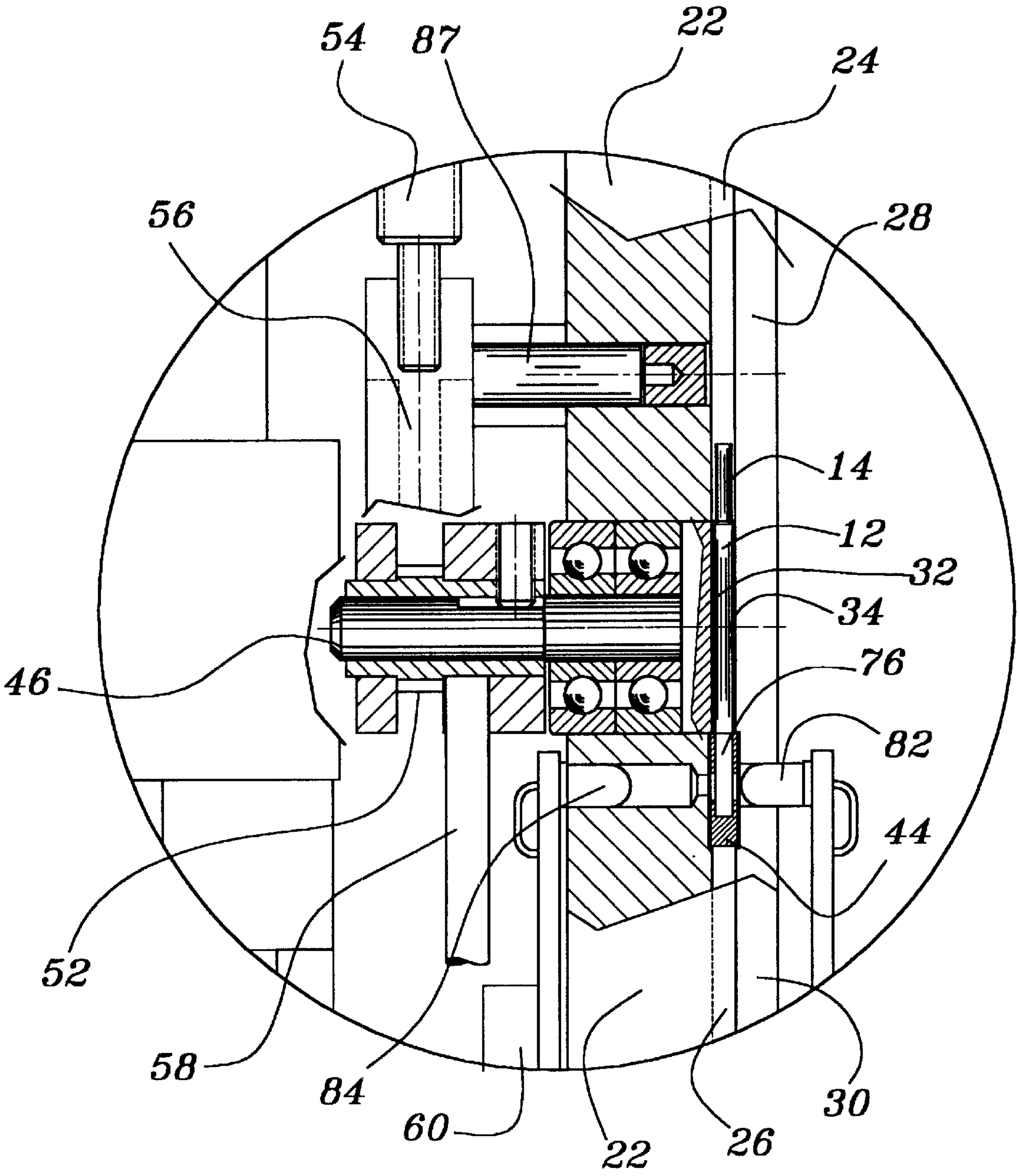
FIG. 2 is an enlargement of the area inscribed by 2—2 of FIG. 1.
Figure 3:
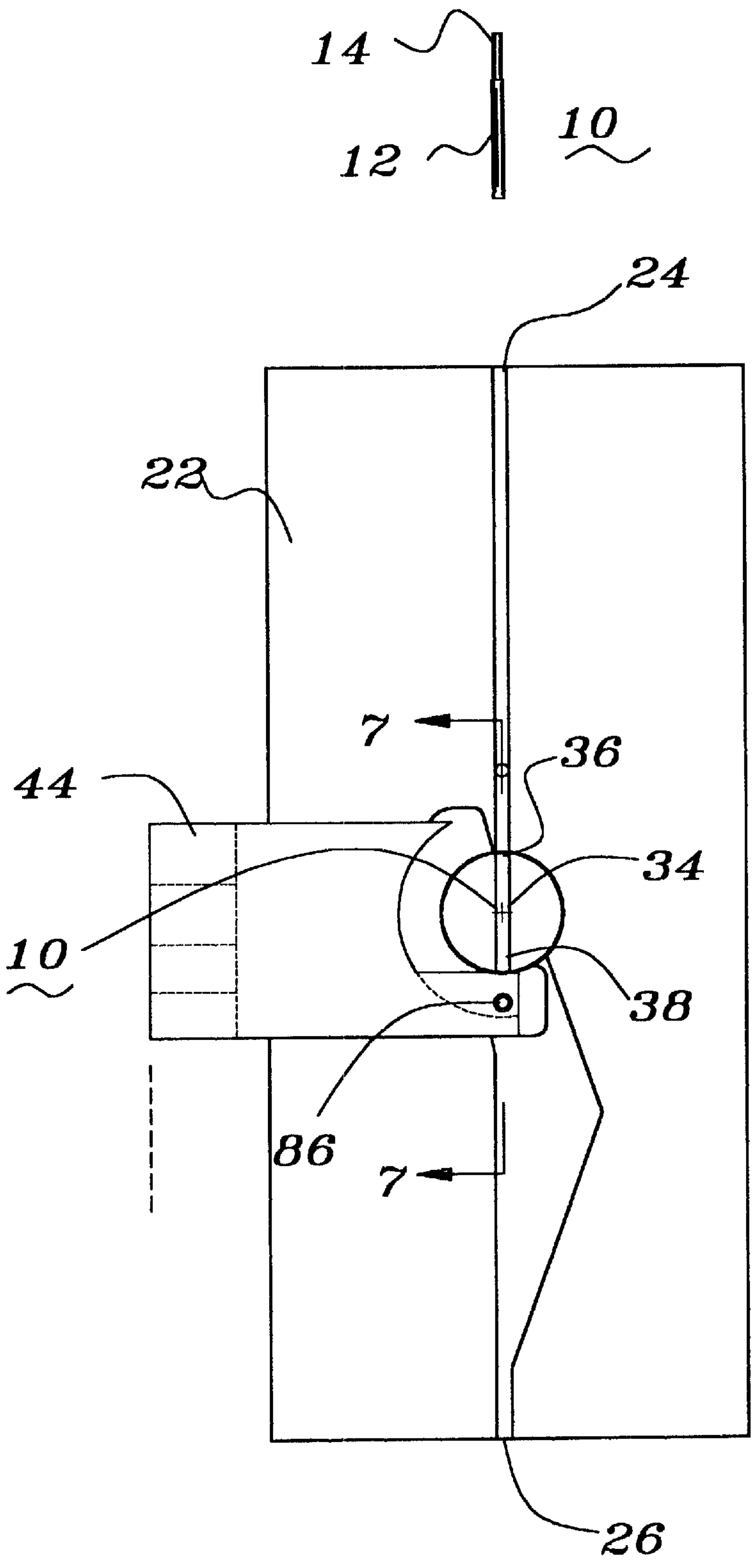
FIG. 3 is a sectional view taken along 3—3 of FIG. 1, illustrating the feeder device of the present invention.

Referring also to FIGS. 2 and 3, an example of a typical component 10, handled by the crimping machine of the present invention, is "MIL-C-39029/57-357" which is a female pin contact having a cylindrical first end 12 (with a specific diameter, for receiving a mating male pin contact) and having a reduced diameter second end 14 (with a specific reduced diameter for receiving a wire conductor for crimping therein.)

The hopper assembly 4 includes a generally cylindrical bowl 8, for receiving the elongated components 10, mounted on a vibratory base 16. The supply chute 6 is adapted to accommodate the components, longitudinally aligned end-to-end and in a random orientation within the supply chute. The supply chute includes a photo switch and controller 18 that senses a level of components in the supply chute and activates/deactivates the vibratory base only as required to urge components into the supply chute to the predetermined level. The hopper assembly is thus actuated only periodically and is otherwise on stand-by without consuming power, creating noise or unduly agitating the components. The supply chute is arranged having a generally vertical alignment so that the components are transferred into and downwardly by gravity within the supply chute.

Figure 4:
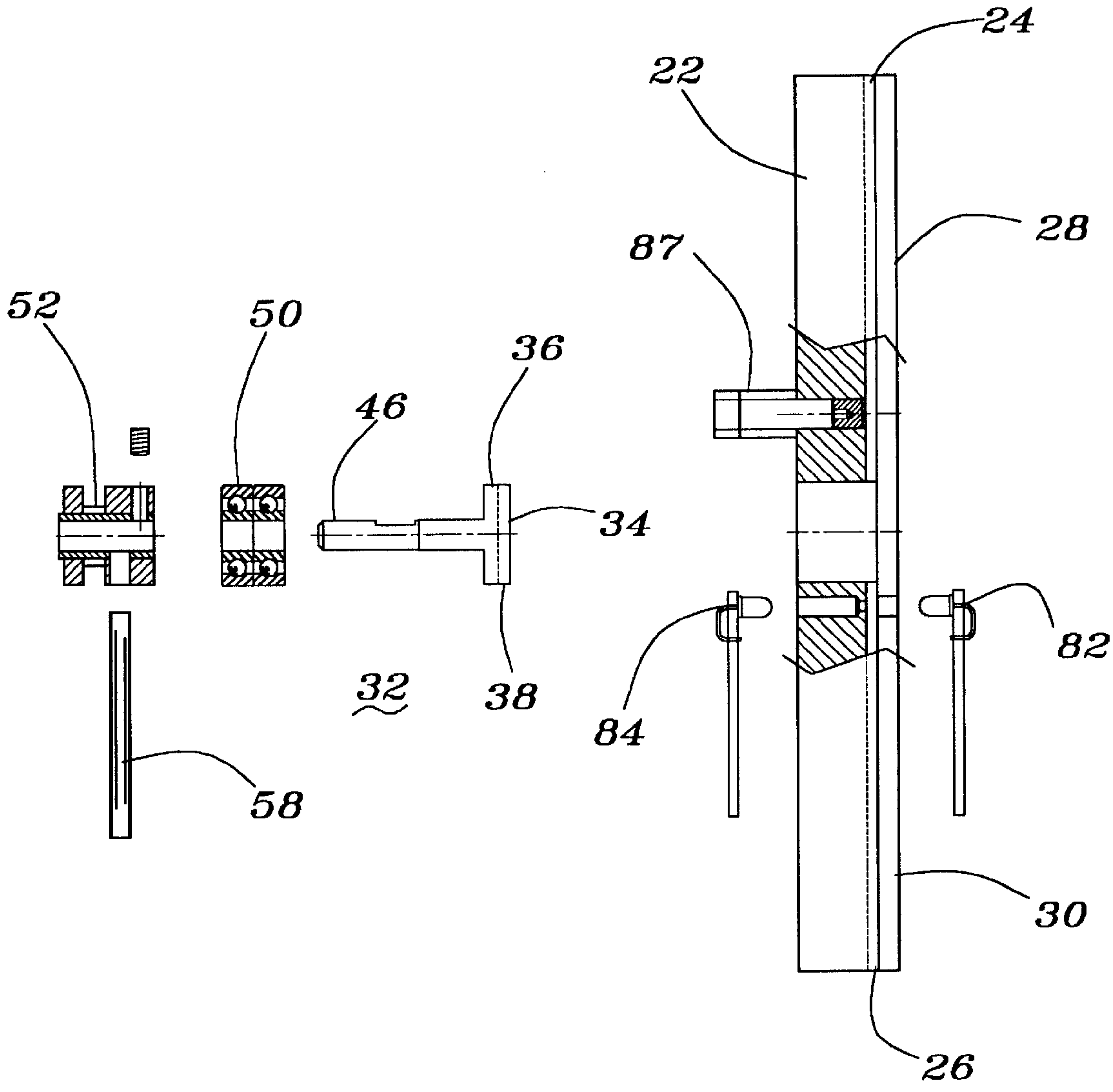
FIG. 4 is an exploded left side elevational view shown partially in cross section through the center of the feeder device of the present invention.
Figure 5:
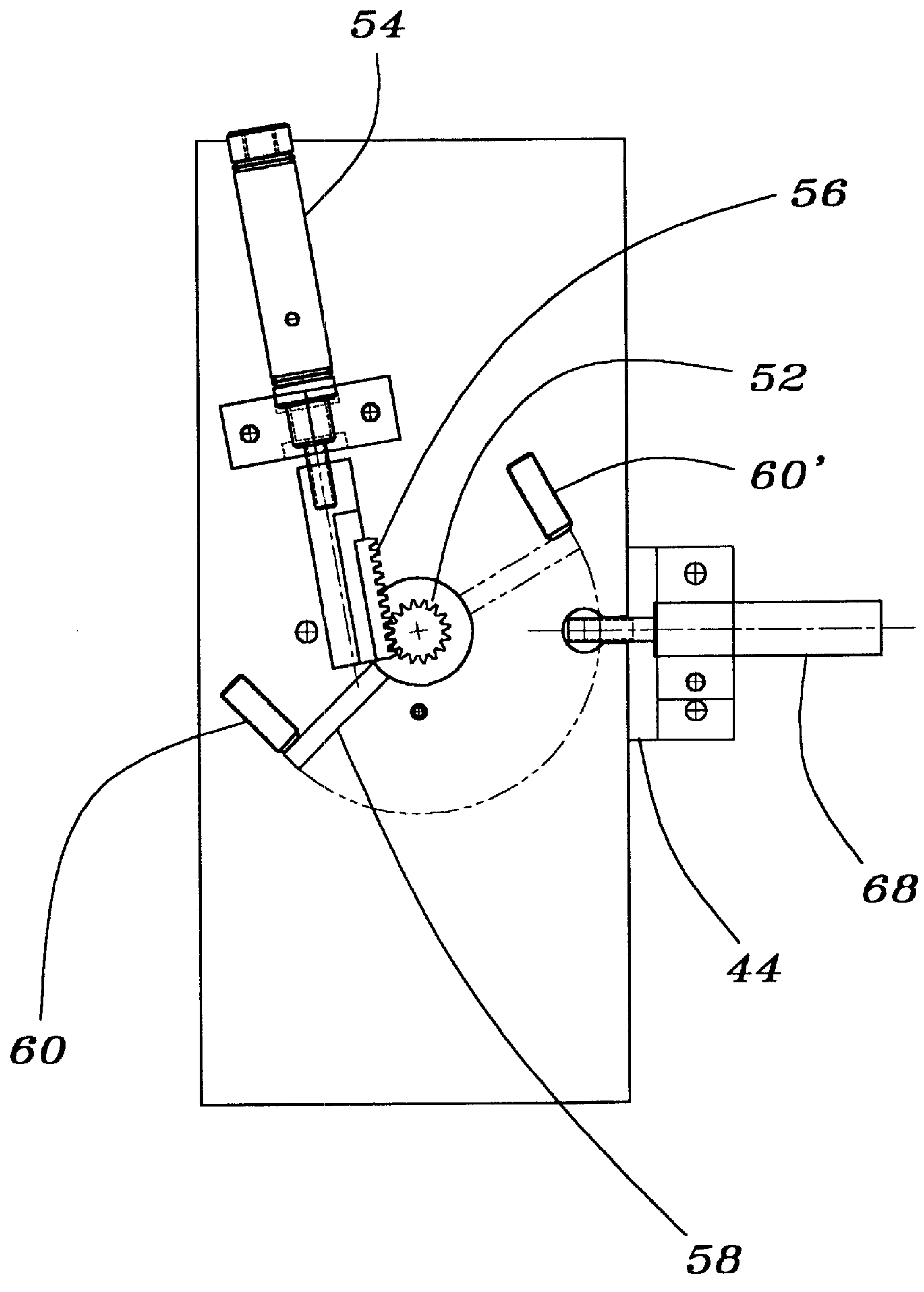
FIG. 5 is a sectional view taken along 5—5 of FIG. 1.
Figure 6:
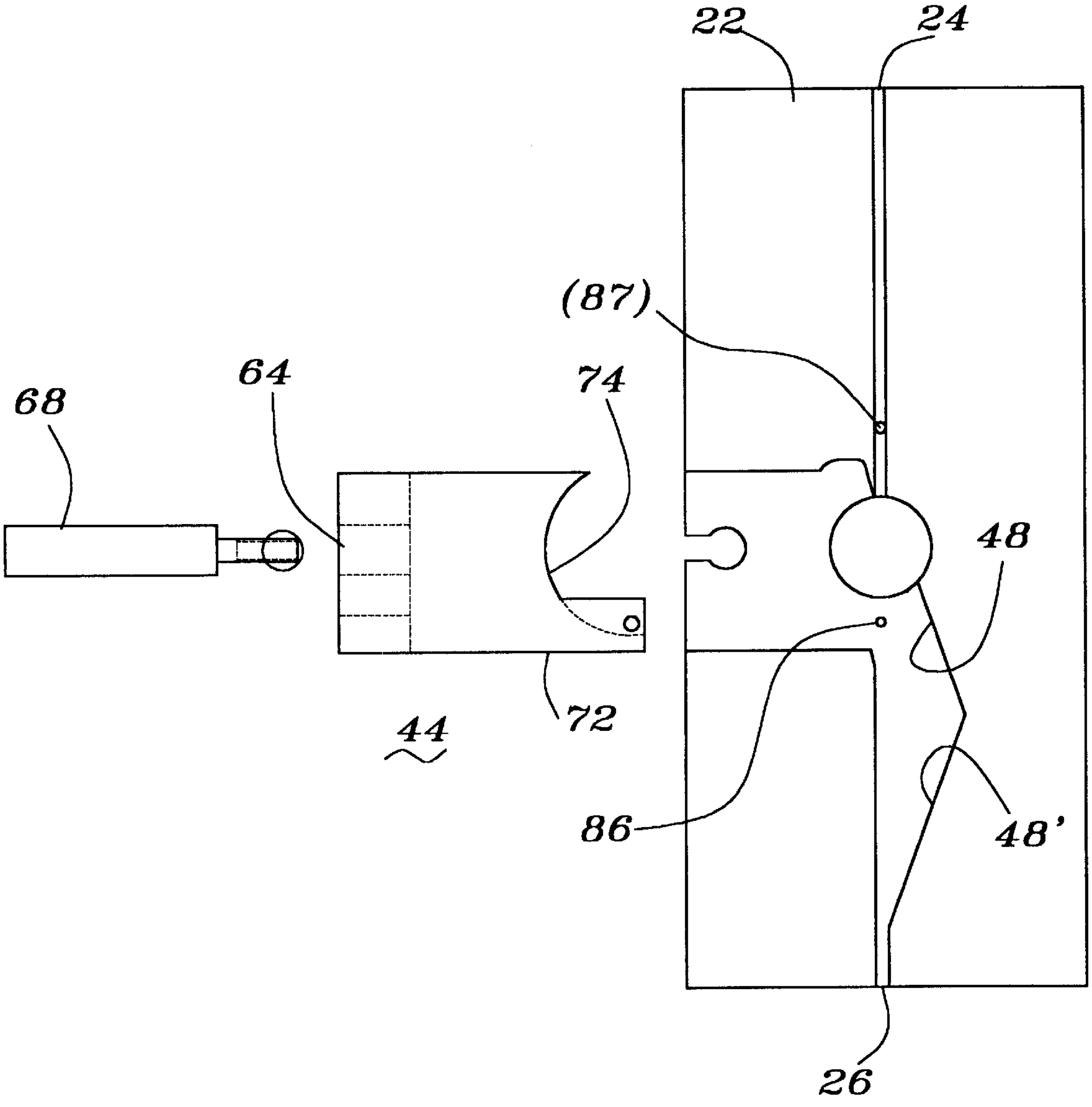
FIG. 6 is an exploded front elevational view, illustrating a gate of the feeder device.

Referring to FIGS. 3–5, as previously introduced, the feeder device 20 includes a housing 22 arranged generally vertically under the supply chute 6 of the hopper assembly. The housing includes the inlet chute 24 having a cross-section adapted to receive a plurality of the components 10, and the outlet chute 26 is adapted to dispense (feed) the components to the crimping assembly 40. The components are transferred by gravity downwardly within the respective chute.

The housing 22 is suitably fabricated from aluminum stock and the inlet chute 24 can be suitably bored into the housing. However, as illustrated, the inlet chute is preferably produced by milling a recessed channel into the face of the housing enclosed by a removable transparent cover 28; and the outlet chute 26 is preferably produced by milling a recessed channel into the face of the housing enclosed by a removable transparent cover 30. The recessed channels provide freedom to easily adapt the shape and contours of the chutes, particularly the outlet chute as discussed later in more detail; and the transparent covers allow the internal function and status of the device to be readily observed during operation. Any defect or malfunction can be easily observed for diagnosis and the covers can be easily removed to maintain or repair the device.

The housing 22 further includes a rotatable disk 32 having a central chamber 34 adapted to receive each of the components, and a releasable gate 44. The disk and gate function independently, as required, between the inlet chute and the outlet chute, to sequentially release (or invert and release) each of the components one-at-a-time and having a desired orientation.

The disk 32 has an axle 46 (see FIGS. 2 and 4) positioned laterally in the housing with the central diameter of the disk aligned generally vertically between the inlet chute and the outlet chute in the housing. The disk has a diameter equal to the length of the first end 12 of the component 10 and has a central chamber 34 (at the vertical diameter) therein adapted to receive one of the components. The disk is suitably fabricated from stainless steel stock and the chamber therein is preferably provided by a recessed channel having a removable transparent cover. The cover can be a separate component or preferably integrated with the cover (s) of the inlet or outlet chute. The disk is oriented to a home position (see FIG. 3) having a first opening 36 of the chamber in communication with the inlet chute 24 and having a second opening 38 of the chamber in communication with the outlet chute 26.

A unique feature of the device is that the disc is rotatable to a second position, to generally invert the orientation of the chamber 34 above the outlet chute 26, thereby positioning the first opening 36 of the chamber in communication with the outlet chute.

Figure 9:
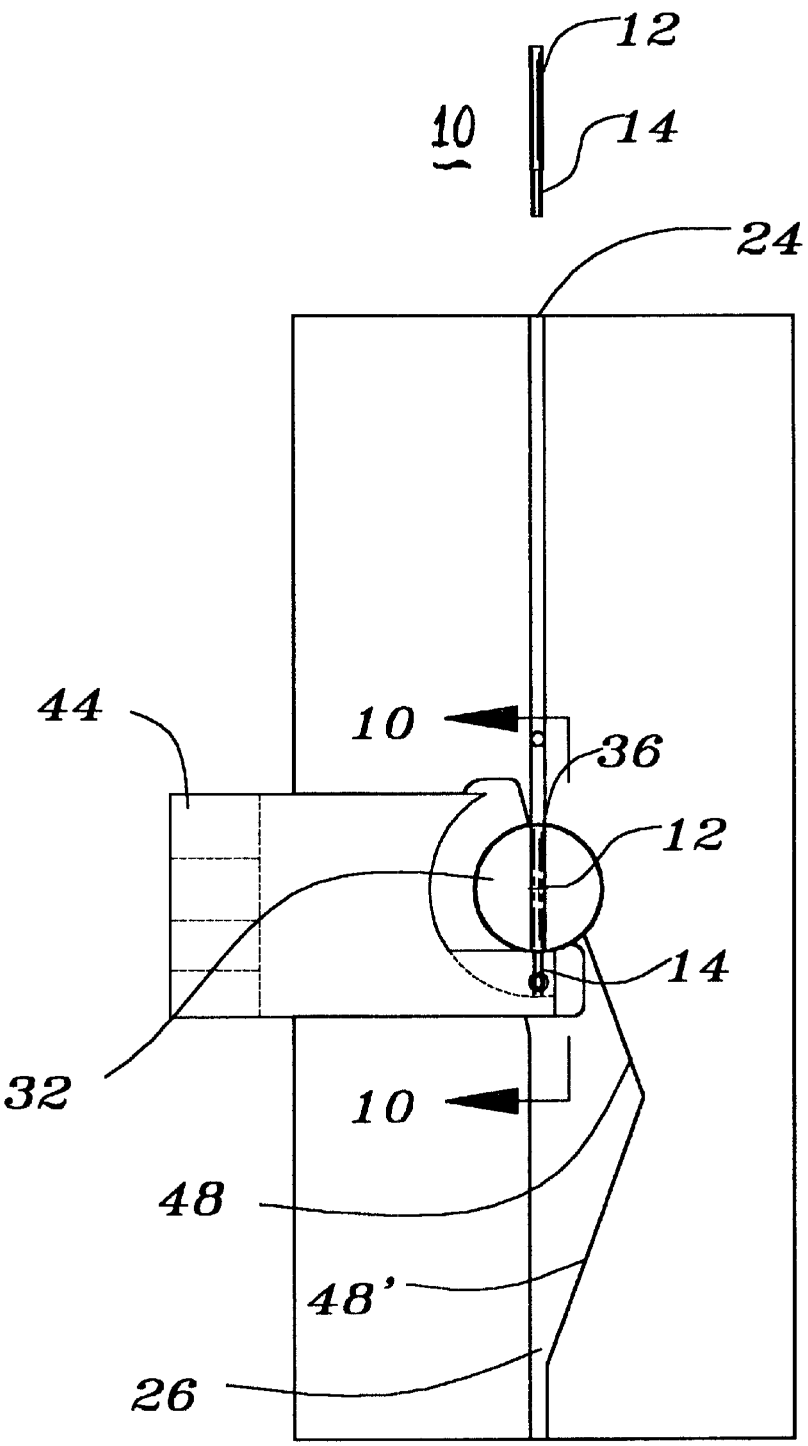
FIG. 9 is a front elevational view of the feeder device in operation.
Figure 11:
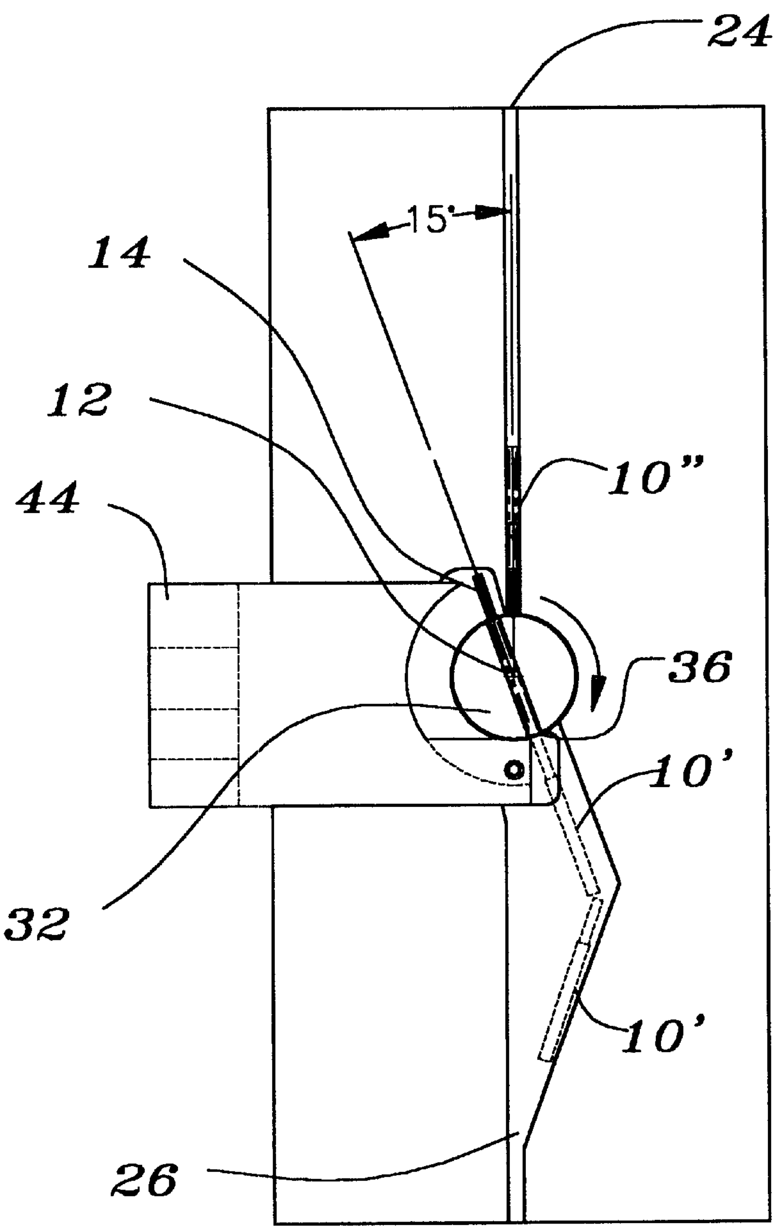
FIG. 11 is a front elevational view, similar to FIG. 9 of the feeder device in operation.

It was found that the disk 32 could effectively be rotated to a second position of slightly less than 180 degrees, in conjunction with a unique configuration of the outlet chute 26 (rather than complete 180 degree inversion) to provide advantages in the function, control and reliability of the feeder device. As shown in FIGS. 9 and 11, the second position of the disk is suitably rotated about 135–175 degrees and is preferably about 165 degrees (or 15 degrees relative to vertical), to reliably invert the first opening 36 of the chamber generally over the outlet chute 26. The outlet chute has an upper portion 48 thereof uniquely adapted to communicate with the first opening 36 in the second position and to receive the full length of one of the components at the 15 degree alignment, for release of the component (shown as 10') from the chamber. The upper portion 48' is further adapted and contoured so that the inverted and released component 10' is smoothly guided by the upper portion 48" into the more vertical portion of the outlet chute 26. The release of the inverted component from the second position of the disk does not require release of the gate 44, and further does not interfere with a next one (shown as one 10") of the components positioned in the inlet chute 24.

The device could alternatively be adapted for disk rotation of 180 degrees to such a second position, with corresponding adaptations of the housing, and the function and control of the gate 44 to release the component. Such an embodiment may be required or advantageous for certain component applications; however, such a configuration is more complicated to produce and control than the preferred embodiment.

The next one (10") of the components in the inlet chute 24 is separated and retained in the inlet chute, inherently by the edge of the disk, during the rotation of the disk to the second position. When the component 10' is released, and the disk is rotated back to the home position, the next one of the components drops into the open chamber 34 of the disk.

The disk 32 is assembled into the housing 22 with suitable bearings 50, including a gear assembly 52 (mounted on the axle 46) extending rearwardly beyond the housing. The disk is suitably actuated by an extendable pneumatic cylinder 54 having a gear rack 56 adapted to engage the gear assembly 52, to thereby rotate the disk from the home position as shown, to the second position (as shown in phantom lines). The gear assembly 52 also includes a position indicator arm 58, and stops 60 and 60' to facilitate precise orientation of the disk within the housing. The actuation of the rotatable disk is controlled by suitable sensors and a controller 62, and is discussed later in detail. The disk can be actuated by alternative means i.e., motor driven rotary gear means, or screw gear drive means, or motor rotation and spring return means, etc., for rotation of the disk from the home position to the second position, and return.

Figure 7:
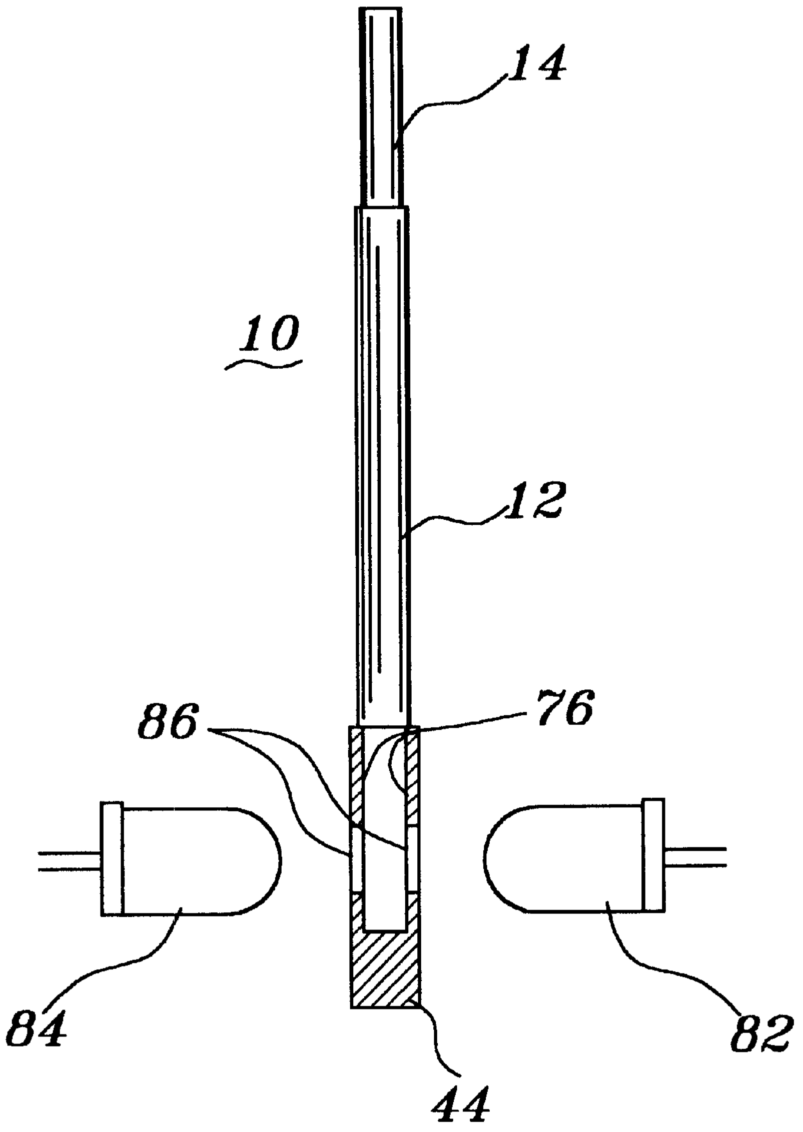
FIG. 7 is a sectional view taken along 7—7 of FIG. 3, and somewhat enlarged.
Figure 8:
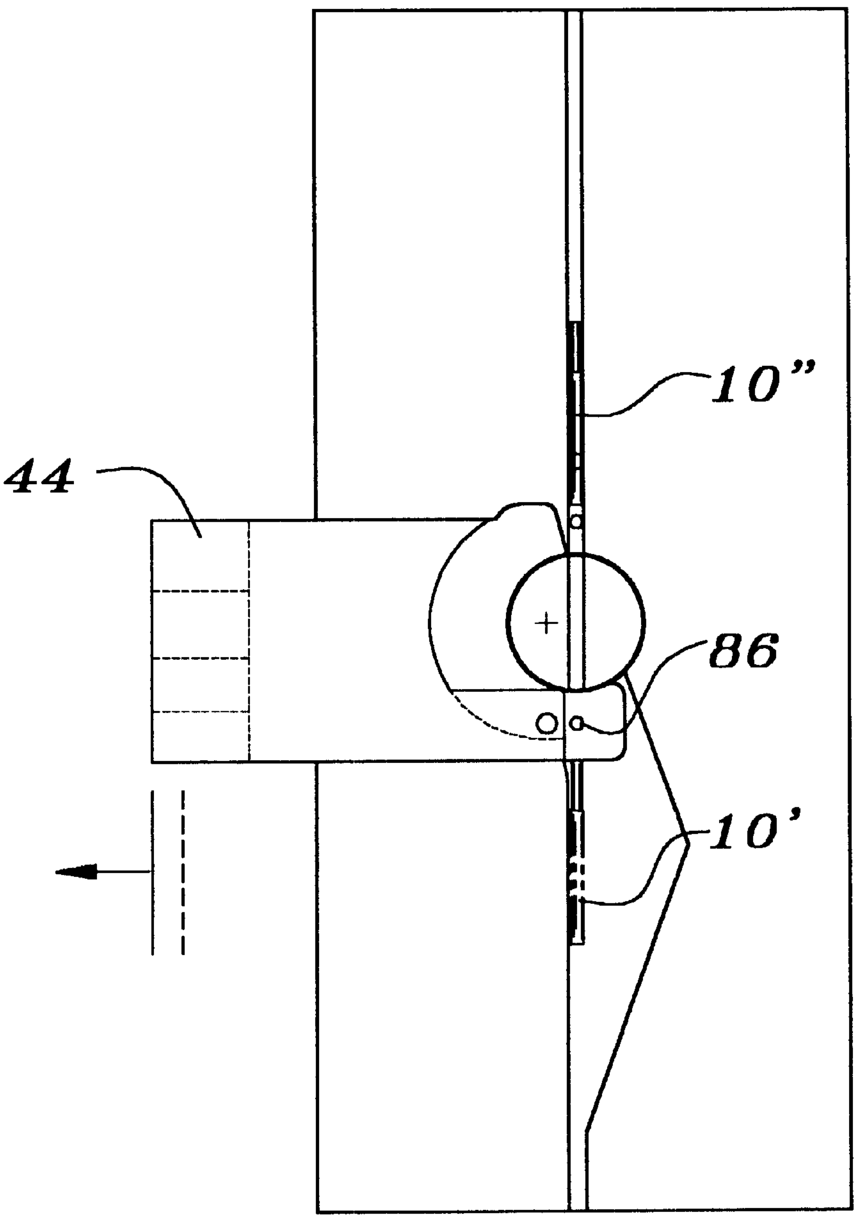
FIG. 8 is a front elevational view of the feeder device in operation.

Referring to FIGS. 6–10, the gate 44 of the feeder device 20 is positioned laterally in the housing 22, between the disk 32 and the outlet chute 26. The gate functions to control the release of one of the components 10, which is received within the chamber 34 of the disk, from the second opening 38 of the chamber and into the outlet chute. The gate in the normal "closed" position blocks the second opening of the chamber; whereas, when the gate is released to the "open" position, the component is allowed to fall from the second opening of the chamber into the outlet chute. The configuration of the gate (see FIG. 5) includes one end 64 extending from the side of the housing for attachment to a suitable pneumatic actuator 68, and having an internal end 72 with a generally semi-circular recess 74 therein. As shown in FIG. 8, the recess is adapted to provide a path for the disk 32, having a portion of one of the components 10 extending from the chamber thereof, during rotation of the disk to the second position. The internal end 72 also includes a slot 76 therein. The gate is suitably fabricated from stainless steel and is shown as machined as a single piece; however, the slot 76 can be provided by a pair of arms attached to the internal end of the gate. The slot 76 is in communication with the second opening 38 of the chamber of the disk. The slot has a height about equal to, or slightly greater than, the length of the second end 14 of one of the components and has a slot width adapted to receive the second end 14 of one of the components and adapted "not" to receive the first end 12 of one of the components. Whereby, each one of the components oriented with the second end upwardly in the chamber would rest "on" the slot of the gate, and each one of the components oriented with the second end downwardly in the chamber would rest "within" the slot of the gate.

Figure 10:
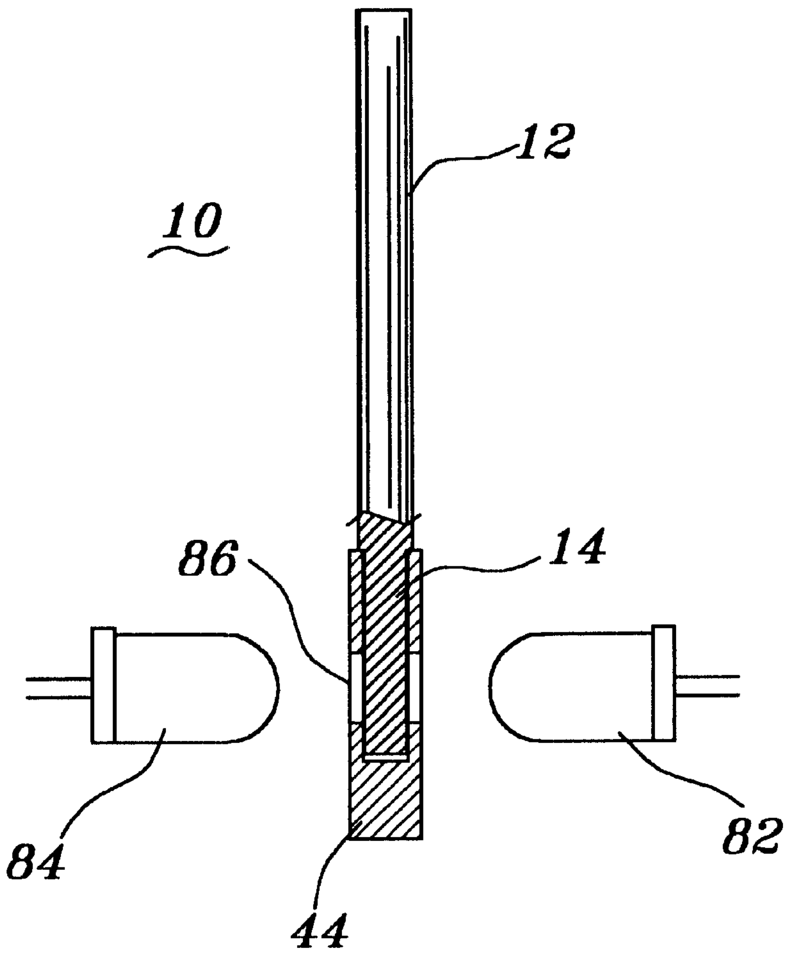
FIG. 10 is a sectional view taken along 10—10 of FIG. 9, and somewhat enlarged.

The orientation of each one of the components 10 received within the chamber 34 can be readily determined by a suitable photo-cell (see FIG. 4) shown typically as a photo emitter 82 and a photo sensor 84. As shown in FIGS. 7 and 10, the photo emitter projects a beam of light laterally through apertures 86 in the gate (and housing 22) into the slot 76, to indicate whether the second end of one of the components is within the slot.

When the photo sensor 84 senses light (see FIG. 10), this indicates that one of the components 10 is resting "on" and "not within" the slot 76 of the gate 44, and is thus oriented with the second end 14 upwardly in the chamber (and the component currently has the desired orientation). The sensor 84 provides this input to the controller 62. When the controller receives a "demand " to transfer a component, the controller releases the gate 44, as shown in FIG. 8, to release the component (shown as 10' by phantom lines) into the outlet chute 26.

The next one of the components 10" in the inlet chute 24 is momentarily retained by a suitable pinch cylinder 87 while the gate 44 is released into the open position. The pinch cylinder (see FIGS. 2 and 4) is positioned laterally within the housing 22, just above the disk, and has a non-abrasive tip (i.e. nylon, delrin, etc.) adapted to be extended into the inlet chute to "pinch" and retain the next one of the components within the chute. The pinch cylinder prevents the next one of the components from dropping through the open chamber 34 of the disk while the gate is open. When the gate is returned to the closed position, the pinch cylinder retracts the tip, allowing the next one of the components to fall into the chamber of the disk.

As shown particularly in FIGS. 9–11, when the photo sensor 84 does not sense the light, this indicates that the light is blocked by the second end 14 of one of the components 10 "within" the slot of the gate, and is thus oriented with the second end oriented downwardly (and the component is currently not oriented in the desired orientation and needs to be inverted prior to release.). The sensor 84 provides this input to the controller 62. When the controller receives a "demand" to transfer a component, the controller will actuate the rotatable disk 32 to the second position, as shown in FIG. 11, to invert the component into the desired orientation and release the component into the outlet chute 26.

Figure 12:
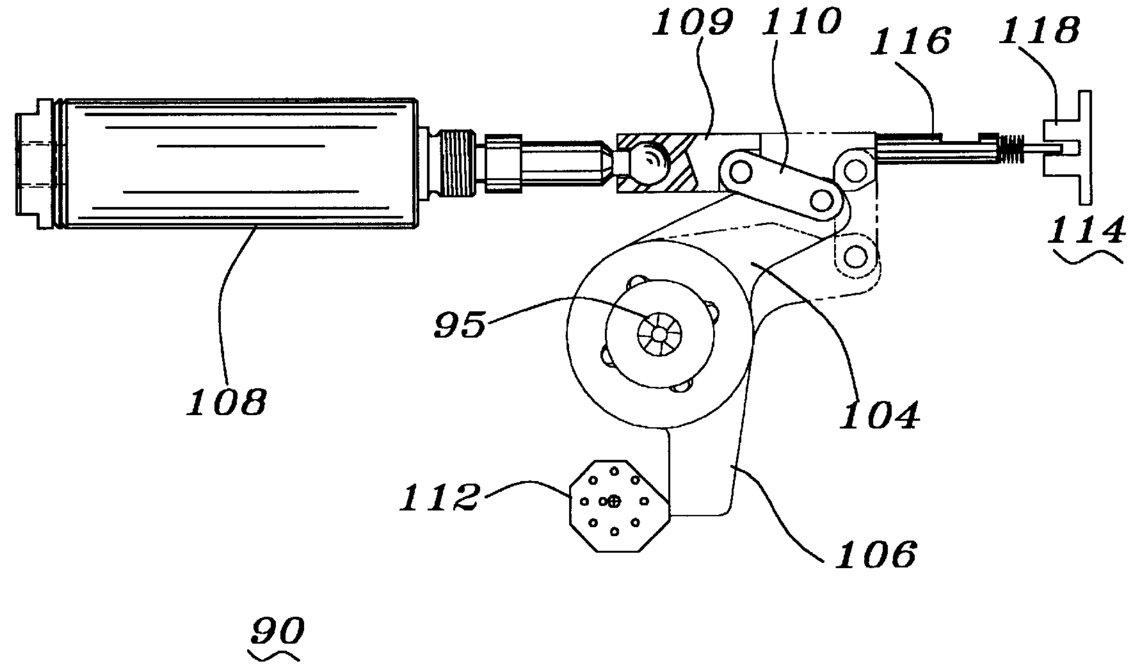
FIG. 12 is a sectional view taken along 12—12 of FIG. 1, illustrating a crimping device of the crimping machine.
Figure 13:
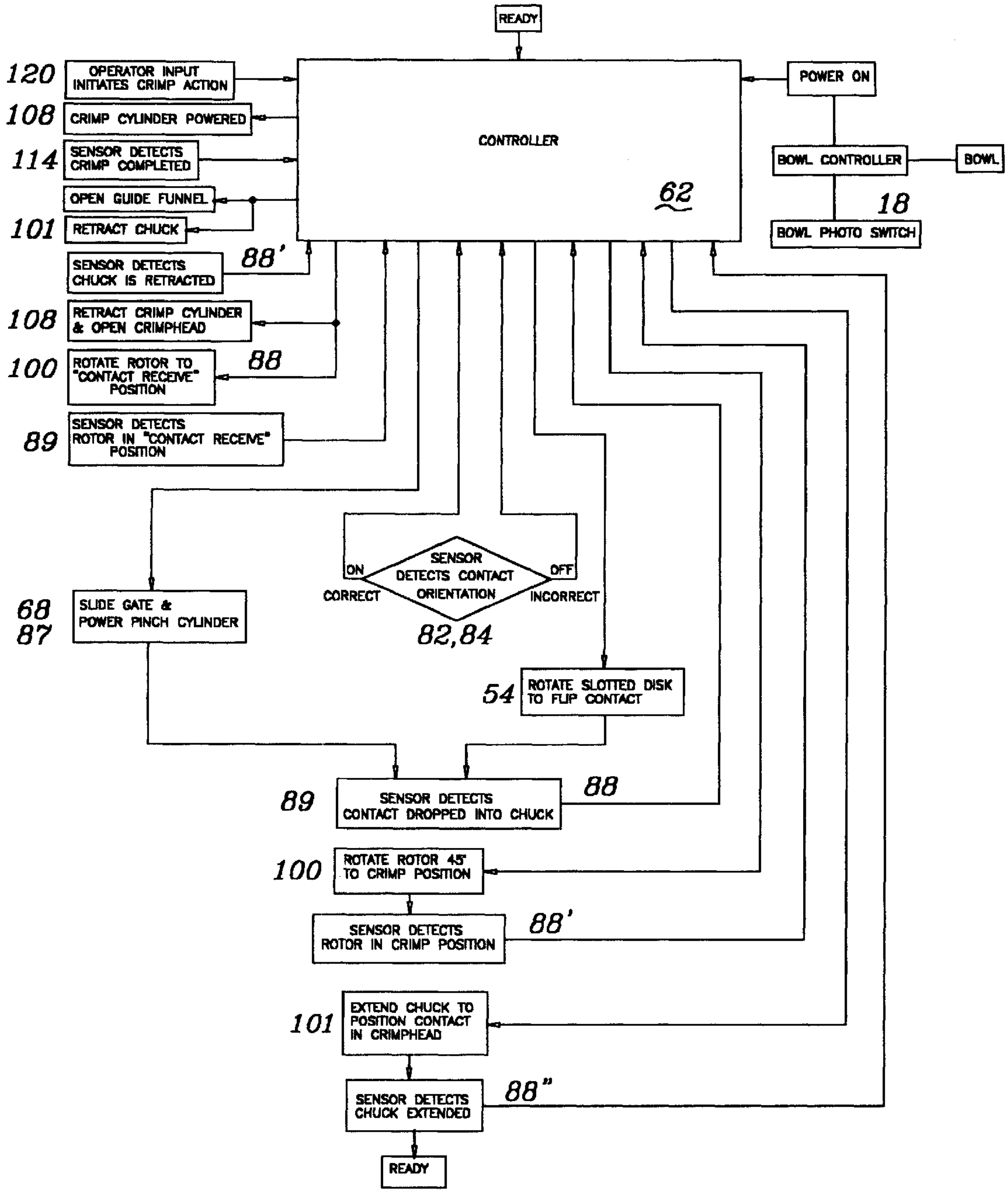
FIG. 13 is a schematic diagram illustrating the controller of the present invention.

Referring also to FIGS. 12 and 13, the feeder device 20 feeds one of the components 10 having the desired orientation to the crimping assembly 40. The crimping assembly 40 includes a component positioning chuck 88 within the interior of the machine, and a component crimping station 90 having a front face 92 inclined at about 45 degrees and enclosing an external insertion port 94 adapted to receive the conductor 42 therein. The front face is inclined to provide good line-of-sight operation for the operator. A component positioning chute 98 is aligned generally vertically under the outlet chute 26 of the feeder device, and is adapted to receive and deposit one of the components 10 into the component positioning chuck 88. The chuck captures the first end 12 of the component (shown in FIG. 1 initially in a generally vertical alignment in phantom lines); the chuck then is pivoted about 45 degrees forward, by a suitable extendable actuator 100, to bring the chuck and the component into a position (shown in solid lines as 88') that is perpendicular to the front face and axially aligned with the insertion port 94.

The crimping station 90 also encloses a set of crimping jaws 102 having a central crimping axis aligned with the insertion port 94 and adapted to perform a crimping operation by the relative rotation of levers 104 and 106. The component positioning chuck then extended to a final position (shown as 88"), by a suitable extendable actuator 92, and is adapted to precisely position the second end 14 of the component into the open crimping jaws of the crimping station.

The crimping jaws are well known and typically function around a central opening with four indenters 95 within one jaw that operate against inclined ramps or cams in the mating jaw; and upon relative rotation of the jaws, the indenters converge toward the center, and thus crimp the second end 14 of the component onto the end of the conductor 42. The crimping operation is performed by an extendable actuator 108 having a ram end 109 interconnected through a link 110 to lever arm 104 which rotates the lever arm; whereas, the mating lever arm 106 is positioned adjacent to an adjustable cam stop 112, which establishes the desired amount of relative rotation of the levers, and thus the depth of crimping upon actuation. A completed-crimp sensor 114 having a spring loaded plunger 116 that translated between a photocell 118, is adapted to be engaged by the ram end 106 at the full extension of the actuator, to signal to the controller 62 that the crimping function has been completed.

The operation of the crimping machine 2 is illustrated by referring to FIG. 1 and also to the schematic diagram FIG. 13. Prior to operation, the crimping machine 2 is typically a the ready "stand-by" mode and having one of the components 10 positioned by the extended chuck 88" within the crimping station 90, and having another one of the components in the chamber 34 of the disk 32, and having additional components aligned end-to-end and randomly oriented within the inlet chute 24 and a bulk quantity of components in the hopper assembly.

To crimp a component on a conductor, the operator inserts the conductor 42 into the insertion port 90 (where the conductor is guided into the second end 14 of the positioned component) and initiates a foot switch 120 (which signals "Operator Initiates Crimp" to the controller). That is all that is required by the operator. The controller 62 then automatically crimps the component onto the conductor and the operator retracts the conductor, with the component securely crimped thereon, from the machine. The controller then automatically retracts and repositions the chuck 88 to receive the next one of the components from the feeder device, senses the orientation of the component currently within the chamber of the disk, and automatically dispenses the component (by releasing the gate or rotating the disk, as required) having the desired orientation into the outlet chute and into the positioning chuck, where the component is positioned within the crimping station and "Ready" for the next conductor and next "Operator Initiates Crimp".

The feeder device automatically receives the next one of the components within the chamber of the disk, and each successive component is transferred to the next position of the process, by quickly and reliably processing the sensor input information, initiating the respective actuator commands, and confirmation of each sequential step, as outlined in FIG. 13. The schematic is easily followed from the initial "Ready" and "Operator Initiates Crimp" from top to bottom, to the next "Ready" condition.

While specific embodiments and examples of the present invention have been illustrated and described herein, it is realized that modifications and changes will occur to those skilled in the art. It is therefore to be understood that the appended claims are intended to cover all such modifications and changes as fall within the spirit and scope of the invention.

What is claimed is:

1. A feeder device for receiving elongated components in a random end-to-end orientation, with each of the components having a first end and a reduced diameter second end, and for dispensing each of the components one-at-a-time having the second end oriented upwardly as a desired orientation thereof, comprising:

a housing having a substantially vertical inlet chute adapted to receive a plurality of the components and an outlet chute adapted to dispense each the components;

a rotatable disk having an axle and positioned laterally between said inlet chute and said outlet chute in said housing and having a diameter corresponding to the length of the first end of one of the components and having a central chamber therein adapted to receive one of the components, with said chamber having a first opening at one thereof and a second opening at the opposite end thereof;

said rotatable disk oriented initially at a home position defined as having the first opening of said chamber in communication with said inlet chute and having the second opening of said chamber in communication with said outlet chute;

said rotatable disc being rotatable from the home position to a second position, to generally invert the orientation of said chamber above said outlet chute, thereby having the first opening of said chamber in communication with said outlet chute, and then back to the home position;

a gate positioned laterally in said housing between said rotatable disc and said outlet chute, and further including a slot therein in communication with the second opening of said chamber, and said slot having a height corresponding to the length of the second end of one of the components and said slot having a width adapted to receive the second end of one of the components and adapted not to receive the first end of one of the components; whereby one of such components oriented with the second end upwardly in said chamber would rest on the slot of said gate, and one of such components oriented with the second end downwardly in said chamber would rest within the slot of said gate;

said gate adapted to be released from a closed position blocking the second opening of said chamber, to an open position not blocking the second opening of the chamber;

sensing means adapted to determine whether one of the components was oriented with the second end upwardly or with the second end downwardly within said chamber and further adapted to provide the orientation determination to a controlling means;

means for release of said gate from the closed position to the open position;

means for rotating said rotatable disc to the home position and to the second position;

means for controlling said release means and said rotating means; whereby, when said sensing means indicates that one of the components is oriented with the second end upwardly in said chamber, the controlling means is adapted to release the gate from the closed position away from the second opening of said chamber and dispense such component into said outlet chute having the desired orientation; and when said sensing means indicates that one of such components is oriented with the second end downwardly in said chamber, the controlling means is adapted to rotate the disc to the second position to thereby invert and dispense such component into the outlet chute having the desired orientation.

2. The feeder device as described in claim 1, wherein said disk is rotatable from the home position ranging from about 135–175 degrees to the second position, and said outlet chute having the upper end thereof adapted to receive the length of one of the components released from the first end of said chamber and at the angle corresponding to the second position of said disk, and said outlet chute having the upper portion thereof further adapted to direct the one of the components to the lower portion thereof.

3. The feeder device as described in claim 1, wherein said disk is rotatable from the home position about 165 degrees to the second position, and said outlet chute having the upper end thereof adapted to receive the length of one of the components released from the first end of said chamber and at the angle corresponding to the second position of said disk, and said outlet chute having the upper portion thereof further adapted to direct the one of the components to the lower portion thereof.

4. The feeder device as described in claim 1, wherein said inlet chute comprises a recessed channel in said housing having a first cover thereon, said outlet chute comprises a recessed channel having a second cover thereon; and said chamber comprises a recessed channel in said disk having a third cover thereon.

5. The feeder device as in claim 4, wherein said first cover, said second cover and said third cover are transparent and adapted so that the internal status and function of the device can be observed.

6. The feeder device as in claim 1, wherein, said sensing means comprises an optical sensor.

7. The feeder device as in claim 1, wherein said gate is adapted to slide from the second opening of said chamber and said gate opening means comprises a retractable and extendable actuator attached to said gate.

8. The feeder device as in claim 1, wherein said disk rotating means comprises a drive gear on the axle of said disk, and an extendable and retractable actuator having a rack gear thereon adapted to engage the drive gear.

9. A feeder device for receiving a loose bulk quantity of elongated components aligned end-to-end in a random orientation, with each of the components having a first end and a reduced diameter second end, and upon demand, for dispensing each of the components one-at-a time and having the second end oriented upwardly as a desired orientation thereof, said feeder device comprising:

an substantially vertical inlet chute adapted to receive the components;

an outlet chute adapted to dispense the components;

means for retaining one of the components from the inlet chute;

means for sensing the orientation of the retained component;

means for releasing each retained component having the desired orientation into the outlet chute, and means for inverting each retained component not having the desired orientation, from end-to-end into the desired orientation, and then releasing the inverted component into the outlet chute.

* * * * *